United States Patent [19]

McCoy

[11] 4,068,400
[45] Jan. 17, 1978

[54] FISHING DEVICE

[76] Inventor: Horace S. McCoy, 11203 Lanewood Circle, Dallas, Tex. 75218

[21] Appl. No.: 648,101

[22] Filed: Jan. 12, 1976

[51] Int. Cl.² .......................................... A01K 97/00
[52] U.S. Cl. ...................................... 43/53.5; 43/43.2
[58] Field of Search ............... 43/53.5, 43.2, 43.6, 43/42.1, 42.43

[56] References Cited

U.S. PATENT DOCUMENTS

| 2,164,907 | 7/1939 | Falkner | 43/53.5 |
| 2,695,471 | 11/1954 | Imberti | 43/53.5 |
| 2,931,125 | 4/1960 | Planin | 43/53.5 |
| 2,967,373 | 1/1961 | Garrison | 43/53.5 |
| 3,132,438 | 5/1964 | Ward et al. | 43/53.5 |
| 3,377,735 | 4/1968 | Daughtry | 43/53.5 |
| 3,670,448 | 6/1972 | Wehmeyer | 43/53.5 |
| 3,683,541 | 8/1972 | Cather | 43/43.6 |

Primary Examiner—Russell R. Kinsey
Assistant Examiner—Daniel J. Leach
Attorney, Agent, or Firm—Hubbard, Thurman, Turner & Tucker

[57] ABSTRACT

A device for attachment to a fishing line in the vicinity of the fish hook for preventing a fish from swallowing the hook and aiding the fisherman in disgorging the hook from the fish. The device includes a hollow cylindrical member adapted to receive and frictionally engage the fishing line therein. The end of the device closest to the fish hook has structure configured to bear against the barbs of the hook to disgorge the hook from the fish as the hook is drawn towards the device. This structure also prevents rehooking the fish as the hook is withdrawn from the fish.

5 Claims, 5 Drawing Figures

U.S. Patent  Jan. 17, 1978  4,068,400
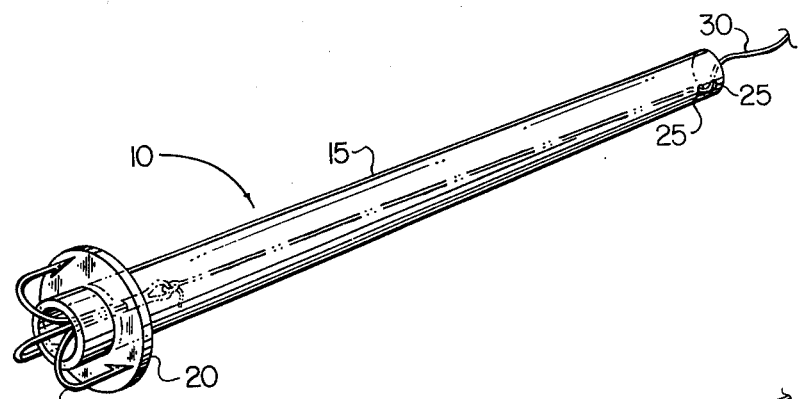
FIG. 1
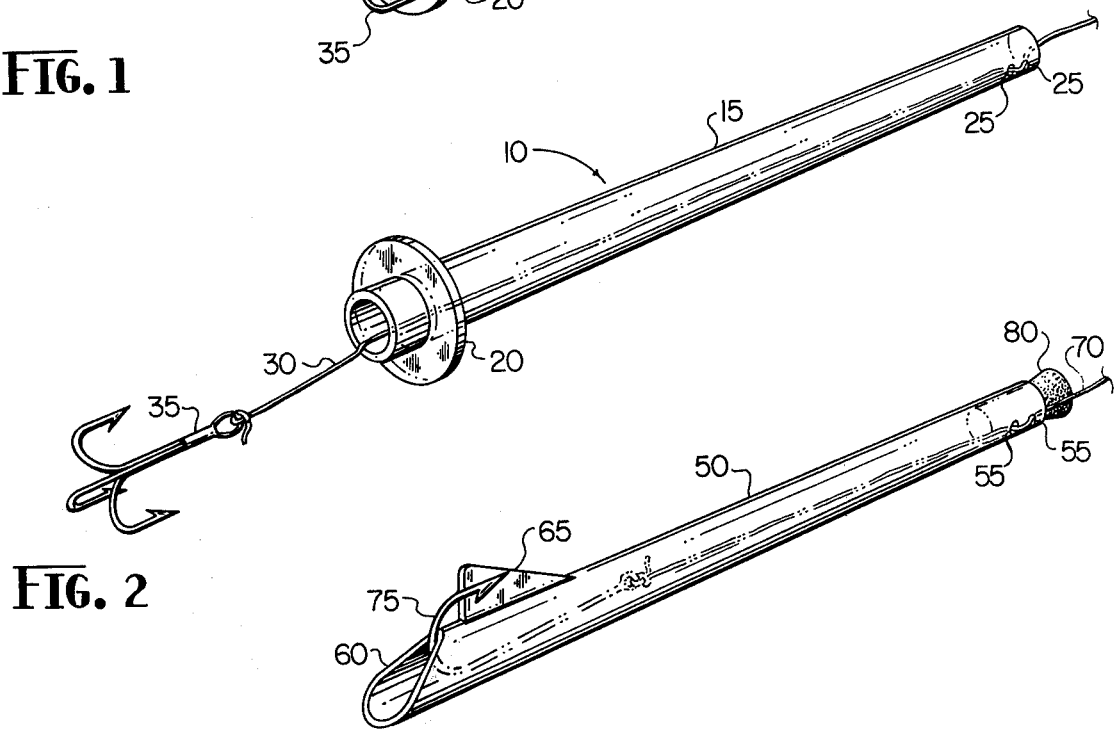
FIG. 2
FIG. 3
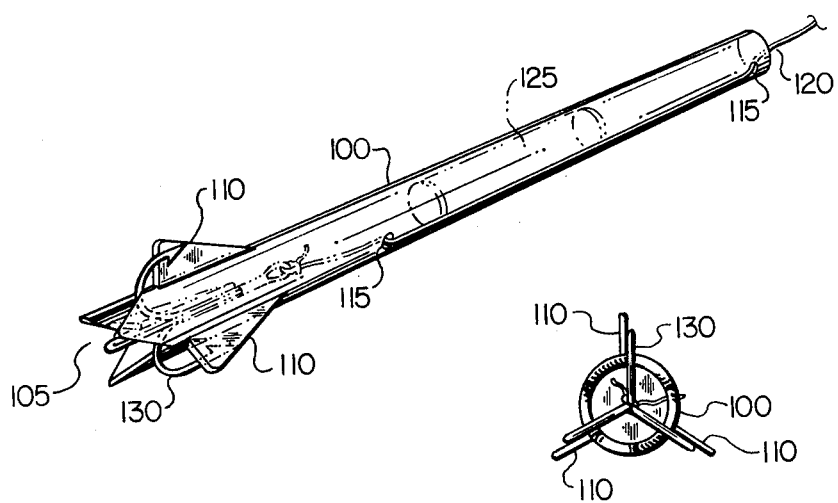
FIG. 4
FIG. 5

FISHING DEVICE

BACKGROUND OF THE INVENTION

This invention relates to a device adapted to be attached to a fishing line and, more particularly, to a device for aiding in disgorging a hook from a fish.

One of the more distasteful aspects of the sport of fishing is removing the fish from the hook after the fish has been caught and reeled in. This is especially true when the fish has swallowed the hook, in which case the hook is embedded deep in the gullet of the fish. To remove, or disgorge, the fish from the hook, the fisherman typically reaches with his fingers into the mouth of the fish and pries the hook loose, ripping the inside of the fish. This process kills smaller fish, which the fisherman may want to release. In addition to the fact that this is a messy process, the fisherman is also presented with the danger of being stuck by the hook, especially when a multibarb hook is utilized.

It is therefore an object of this invention to provide a device to aid a fisherman in removing a fish from a hook.

It is another object of this invention to provide a device for preventing a fish from deeply swallowing a hook.

It is a further object of this invention to provide a device to prevent rehooking the fish as the hook is being removed therefrom.

It is a further object of the invention to provide a device which prevents snagging of the hook when not in use.

SUMMARY OF THE INVENTION

The foregoing and additional objects of this invention are attained by providing an elongated hollow member adapted to receive a fishing line therethrough. This member is provided with a plurality of small holes adapted to threadably receive and frictionally engage the fishing line. At the end of the elongated member closest to the hook attached to the fishing line, structure is provided to bear against the barbs of the hook. The fishing device is manufactured of a hard material so that as the hook is pulled toward the end structure, the hook is automatically torn from the fish. The device may be placed close enough to the hook so that the fish is prevented from swallowing the hook. In addition, the device may be provided with an air chamber or other buoyancy producing attachment if desired.

DESCRIPTION OF THE DRAWING

The foregoing will be more readily apparent upon reading the following description in conjunction with the drawing in which:

FIG. 1 depicts a perspective view of a fishing device constructed in accordance with the principles of this invention and adapted to be utilized with a multibarb hook;

FIG. 2 depicts a perspective view of the device shown in FIG. 1 with the hook extended out from the device;

FIG. 3 depicts a perspective view of an alternate embodiment of a device constructed in accordance with this invention particularly adapted for use with a single barb hook and showing the addition of a buoyancy producing device;

FIG. 4 depicts a further alternate embodiment of a device constructed in accordance with this invention particularly adapted for use with a multibarb hook and further including the addition of an air chamber to provide buoyancy; and FIG. 5 depicts an end view of the device shown in FIG. 4.

DESCRIPTION OF THE PREFERRED EMBODIMENT

Referring now to FIG. 1, depicted therein is a fishing device 10 constructed in accordance with the principles of this invention. Device 10 comprises an elongated hollow member 15 having a flat disc 20 affixed thereto at one end. A pair of holes 25 are provided through the wall of hollow member 15. Although holes 25 are shown near the other end of cylindrical member 15 away from disc 20, it will become apparent from the discussion which follows that although this is probably the most convenient location for holes 25, it is not an intended restriction that they be so located.

In use, fishing line 30 is threaded through the pair of holes 25 and extended down through hollow member 15. The end of line 30 exiting member 15 near the disc 20 is attached to multibarb hook 35. The hook 35 may then be pulled away from device 10, as shown in FIG. 2, bait may be attached to hook 35 and the fisherman may then attempt to catch a fish. When a fish bites hook 35, device 10 prevents the fish from deeply swallowing the hook 35, it being understood that in order for this desired effect to be achieved, the length of fishing line 30 between hook 35 and the end of device 10 must not be excessively long. The threading of line 30 through holes 25 provides a frictional engagement between line 30 and device 10 to maintain the distance of hook 35 from the device 10 constant under normal use.

When a fish is reeled in, the fisherman may grasp device 10 in one hand and the fishing line 30 extending out of device 10 from the end closest to holes 25 in the other hand and pull the fishing line 30 so that hook 35 is drawn toward disc 20. The device 10 is then pushed in to disengage the hook 35 from the fish and the device 10, along with the hook 35 is then withdrawn from the fish. It will be noted that the hook can be disengaged from the fish without the necessity for handling the fish, minimizing the possibility of being bitten or finned by the fish. A synergistic advantage achieved by the device depicted in FIGS. 1 and 2 is that with hook 35 drawn in against disc 20, the barbed ends of the hook are prevented from rehooking the fish as the hook is withdrawn, as well as not catching on the fisherman's fingers, clothes or other loose matter during handling. Also, if the hook assembly is stored in the retracted position shown in FIGS. 1, 3 and 4 the assemblies can be stored without becoming entangled by meshing of the hooks.

FIG. 3 depicts a perspective view of an alternate embodiment according to this invention which is particularly suited for use with single barbed hooks. This embodiment comprises a hollow cylindrical tube member 50 with a pair of holes 55 at one end thereof. The other end 60 of tube 50 is cut on a slant. A projecting fin 65 is affixed to the outside of tube 50 and extends radially out therefrom near end 60. In use, hook 75 is pulled out from tube 50, baited, and thrown into the water and hopefully a fish will soon be caught. When the fish is caught, fishing line 70 is then pulled through tube 50. The disgorging action is the same as described above. The slanted opening of end 60 insures that hook 75 will contact fin 65. If desired, a small cork 80 or similar buoyant object may be inserted in tube 50 to provide buoyancy. The object 80 preferably seals the end of the tube with entrapped air providing additional buoyancy.

FIGS. 4 and 5 depict the embodiment of FIG. 3 modified for use with a multibarb (illustratively three) hook. Tube 100 has one end 105 cut into notches, one for each of the prongs on the hook. Projecting fins 110 are affixed to the outer wall of tube 100, one fin per notch and located longitudinally of the deep end of each notch. Tube 100 is provided with a pair of holes 115 for frictionally engaging fishing line 120. In the embodiment of FIG. 4, the holes 115 are shown spaced apart at opposite ends of an air chamber 125, which may be desired for buoyancy purposes. Line 120 is connected to a multibarbed hook 130, which is shown with its barbs resting against projecting fins 110. In operation, the embodiment depicted in FIGS. 4 and 5 operates the same way as the embodiment depicted in FIG. 3.

There have been prior attempts to perform a similar function to that described hereinabove. However, the instant invention advantageously achieves the desired result with a unitary structure having no moving parts. This is especially desirable when one considers the environment in which the illustrated device is to be used, possibly a small open boat.

Accordingly, there has been described an improved fishing device. Numouers other variations, modifications and adaptations of the present invention will be apparent to those skilled in the art and such as come within the spirit and scope of the appended claims are considered to be embraced by the present invention.

What is claimed is:

1. An improved fishing device for attachment to a fishing line having a hook at one end thereof, said device comprising:
    an elongated hollow member open at both ends and having at least one hole in its wall for providing frictional engagement between said line and said member when said line is threaded through said at least one hole;
    at least one notch, with a generally pointed deep end formed in one end of said hollow member; and
    at least one fin projecting outward from said hollow member,
    said notch having said fin associated therewith with the fin being longitudinally displaced from the deep end of the notch.

2. The device of claim 1 further comprising means for providing buoyancy to said device.

3. The device of claim 1, wherein a plurality of notches are formed in the one end of said hollow member, and including a plurality of fins, each associated with one of the notches and longitudinally displaced from the deep end of the associated notch.

4. The device of claim 1 wherein said at least one hole is positioned near the other end of said hollow member.

5. The device of claim 2 wherein said means for providing buoyancy comprises means for sealing the other end of said hollow member and said at least one hole to trap air in said hollow member above said one end.

* * * * *